(12) United States Patent
Sohn et al.

(10) Patent No.: US 9,107,242 B2
(45) Date of Patent: Aug. 11, 2015

(54) CHANNEL SOUNDING METHOD IN WIRELESS LOCAL AREA NETWORK SYSTEM AND APPARATUS FOR SUPPORTING THE SAME

(75) Inventors: Ill Soo Sohn, Anyang-si (KR); Yong Ho Seok, Anyang-si (KR); Jong Hyun Park, Anyang-si (KR); Dae Won Lee, Anyang-si (KR); Byeong Woo Kang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 181 days.

(21) Appl. No.: 13/880,329

(22) PCT Filed: Dec. 27, 2011

(86) PCT No.: PCT/KR2011/010133
§ 371 (c)(1),
(2), (4) Date: Apr. 18, 2013

(87) PCT Pub. No.: WO2012/093794
PCT Pub. Date: Jul. 12, 2012

(65) Prior Publication Data
US 2013/0223427 A1  Aug. 29, 2013

Related U.S. Application Data

(60) Provisional application No. 61/429,197, filed on Jan. 3, 2011, provisional application No. 61/508,021, filed on Jul. 14, 2011.

(51) Int. Cl.
*H04B 7/00* (2006.01)
*H04W 84/12* (2009.01)
*H04W 74/06* (2009.01)

(52) U.S. Cl.
CPC .............. *H04W 84/12* (2013.01); *H04W 74/06* (2013.01)

(58) Field of Classification Search
None
See application file for complete search history.

(56) References Cited

U.S. PATENT DOCUMENTS

2010/0260138 A1  10/2010  Liu et al.
2010/0271992 A1  10/2010  Wentink et al.
(Continued)

FOREIGN PATENT DOCUMENTS

JP  2009/543471 A  12/2009
JP  2012-511860 A  5/2012
(Continued)

OTHER PUBLICATIONS

Merlin et al., "Protocol for SU and MU Sounding Feedback," IEEE 802.11-10/1091r0, Sep. 14, 2010, Slides 1-7.

*Primary Examiner* — Kevin C Harper
(74) *Attorney, Agent, or Firm* — Birch, Stewart, Kolasch & Birch, LLP

(57) ABSTRACT

A method for a channel sounding in a wireless local area network is provided. The method includes transmitting a null data packet announcement (NDPA) frame, to a plurality of receivers, the NDPA frame requesting a channel statement information feedback and announcing that a null data packet (NDP) frame is to be transmitted; transmitting the NDP frame being a basis of channel estimation for the plurality of receivers; receiving a first feedback frame from a first receiver among the plurality of receivers, transmitting a feedback poll frame to a second receiver; and, receiving a second feedback frame from the second receiver, the second feedback frame including second channel state information estimated by the second receiver. If the first receiver fails to perform the channel estimation, the first feedback frame is a null feedback frame. The null feedback frame is a feedback frame not including channel state information.

6 Claims, 8 Drawing Sheets

(56) References Cited

U.S. PATENT DOCUMENTS

| | | |
|---|---|---|
| 2011/0243025 A1 | 10/2011 | Kim et al. |
| 2012/0257567 A1* | 10/2012 | Abraham et al. ............. 370/328 |
| 2013/0010632 A1* | 1/2013 | Wang et al. .................. 370/252 |

FOREIGN PATENT DOCUMENTS

| | | |
|---|---|---|
| JP | 2012-521137 A | 9/2012 |
| JP | 2012-529217 A | 11/2012 |
| JP | 2012-531793 A | 12/2012 |
| JP | 2013-541248 A | 11/2013 |
| KR | 10-2010-0067894 A | 6/2010 |
| WO | WO 2008/002972 A2 | 1/2008 |
| WO | WO 2010/107165 A1 | 9/2010 |
| WO | WO 2010/140742 A1 | 12/2010 |
| WO | WO 2010/150950 A | 12/2010 |
| WO | WO 2012/021449 A1 | 2/2012 |

* cited by examiner

CHANNEL SOUNDING METHOD IN WIRELESS LOCAL AREA NETWORK SYSTEM AND APPARATUS FOR SUPPORTING THE SAME

CROSS REFERENCE TO RELATED APPLICATIONS

This application is the National Phase of PCT/KR2011/010133 filed on Dec. 27, 2011, which claims priority under 35 U.S.C. 119(e) to U.S. Provisional Application Nos. 61/429,197 filed on Jan. 3, 2011 and 61/508,021 filed on Jul. 14, 2011, all of which are hereby expressly incorporated by reference into the present application.

TECHNICAL FIELD

The present invention relates to a Wireless Local Area Network (WLAN) system and, more particularly, to a channel sounding method between stations (STAs) in a WLAN system and an apparatus for supporting the same.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

With the widespread use of the WLAN and the diversification of applications using the WLAN, there is a recent demand for a new WLAN system to support a higher throughput than a data processing rate supported by the IEEE 802.11n. A next-generation WLAN system supporting a very high throughput (VHT) is a next version of the IEEE 802.11n WLAN system, and is one of IEEE 802.11 WLAN systems which have recently been proposed to support a data processing rate of above 1 Gbps in a MAC service access point (SAP).

The next-generation WLAN system supports the transmission of a Multi-User Multiple Input Multiple Output (MU-MIMO) scheme in which a plurality of non-AP STAs accesses a radio channel at the same time in order to efficiently use the radio channel. According to the MU-MIMO transmission scheme, an AP can transmit a frame to one or more MIMO-paired STAs at the same time.

The AP and the plurality of MU-MIMO paired STAs may have different capabilities. In this case, a supportable bandwidth, modulation coding scheme (MCS), forward error correction (FEC), etc., may vary depending on an STA type, usage, channel environment, etc.

In a WLAN system, an Access Point (AP) or an STA or both may obtain information about a channel to be used in transmitting a frame to a target reception AP or STA or both. This may be performed through a channel sounding procedure. That is, a process in which a transmitter requests channel information to be used for frame transmission and reception from a receiver and the receiver estimates the channel and feeds the channel information about the channel to the transmitter may be performed before the transmission and reception of a data frame. Meanwhile, the next-generation WLAN system may receive a greater amount of channel information from a target transmission AP or STA or both because a wider channel bandwidth and an MU-MIMO transmission scheme are adopted. In order to transmit more feedback information, the target transmission AP or STA or both have to access channels for a longer time.

An AP or an STA or both may do not normally receive necessary control information and data while performing a procedure for channel sounding. In this case, an STA or STAs or both that are intended to estimate channels may do not estimate the channels or do not transmit a feedback frame because they do not know whether channel sounding has been started. In this case, an AP or an STA or both that have started channel sounding starts channel sounding again from the beginning because they have not received the feedback frame. Accordingly, there are problems in that an STA or STAs or both that have already estimated channels consume power due to unnecessary operations and the channels are unnecessarily occupied. For this reason, there is a need to introduce a channel sounding method capable of solving the problems.

SUMMARY OF INVENTION

Technical Problem

It is an object of the present invention to provide a channel sounding method performed by STAs in the next-generation WLAN system supporting Multi-User (MU)-Multiple Input Multiple Output (MIMO).

Solution to Problem

In an aspect, a method for a channel sounding in a wireless local area network is provided. The method includes transmitting a null data packet announcement (NDPA) frame, to a plurality of receivers, the NDPA frame requesting a channel statement information feedback and announcing that a null data packet (NDP) frame is to be transmitted; transmitting the NDP frame being a basis of channel estimation for the plurality of receivers; receiving a first feedback frame from a first receiver among the plurality of receivers, transmitting a feedback poll frame to a second receiver; and, receiving a second feedback frame from the second receiver, the second feedback frame including second channel state information estimated by the second receiver. If the first receiver fails to perform the channel estimation, the first feedback frame is a null feedback frame. The null feedback frame is a feedback frame not including channel state information.

The first feedback frame may be transmitted through a bandwidth through which the NDPA frame is transmitted.

The NDP frame may include a length field indicating a time duration where the NDP frame is transmitted.

The first feedback frame may be transmitted after the time duration elapses from a point of time at which the NDP frame was transmitted.

The first feedback frame may include a first channel state information. If the first receiver receives the NDPA frame and the NDP frame through a bandwidth narrower than a reference bandwidth through which the NDPA is transmitted, the first channel state information may be channel information estimated for the bandwidth.

The first feedback frame may be transmitted through the bandwidth.

The feedback poll frame may include a channel estimation bandwidth indication field indicating a recommended bandwidth for which the second channel state information is estimated.

The feedback poll frame may further include a feedback frame bandwidth indication field indicating a maximum bandwidth through which the second feedback frame is transmitted.

The feedback poll frame may further include a reason field indicating at least one reason why the bandwidth is narrower than the reference bandwidth.

The at least one reason may respectively correspond to each of at least one reason code.

In another aspect, a wireless apparatus is provided. The apparatus includes a transceiver transmitting and receiving frames; and a processor operationally coupled to the transceiver. The processor is configured for: transmitting a null data packet announcement (NDPA) frame, to a plurality of receivers, the NDPA frame requesting a channel statement information feedback and announcing that a null data packet (NDP) frame is to be transmitted; transmitting the NDP frame being a basis of channel estimation for the plurality of receivers; receiving a first feedback frame from a first receiver among the plurality of receivers; transmitting a feedback poll frame to a second receiver; and, receiving a second feedback frame from the second receiver, the second feedback frame including second channel state information estimated by the second receiver. If the first receiver fails to perform the channel estimation, the first feedback frame is a null feedback frame. The null feedback frame is a feedback frame not including channel state information.

Advantageous Effects of Invention

According to an embodiment of the present invention, in a channel sounding procedure, if a receiving STA having the highest priority to transmit a feedback normally receives a Null Data Packet Announcement (NDPA) frame transmitted in a duplicate type regarding a specific bandwidth although it has failed in channel estimation, the receiving STA transmits a null feedback frame to a transmitting STA, such as an AP. When the null feedback frame is received, the AP can perform the remaining channel sounding procedure for other receiving STAs. Accordingly, channel sounding efficiency can be improved as compared with the existing method because although the receiving STA having the highest priority to transmit a feedback fails in channel estimation, the remaining receiving STAs can feed estimated channel state information back.

According to an embodiment of the present invention, if interference occurs in a specific bandwidth when a receiving STA receives an NDPA frame or an NDP frame or both, a bandwidth for channel state information and a bandwidth for a feedback frame are controlled. Accordingly, efficiency can be improved because channel sounding can be performed by avoiding interference with a specific bandwidth or channel occupancy by other STAs.

MODE FOR THE INVENTION

Figure 1:
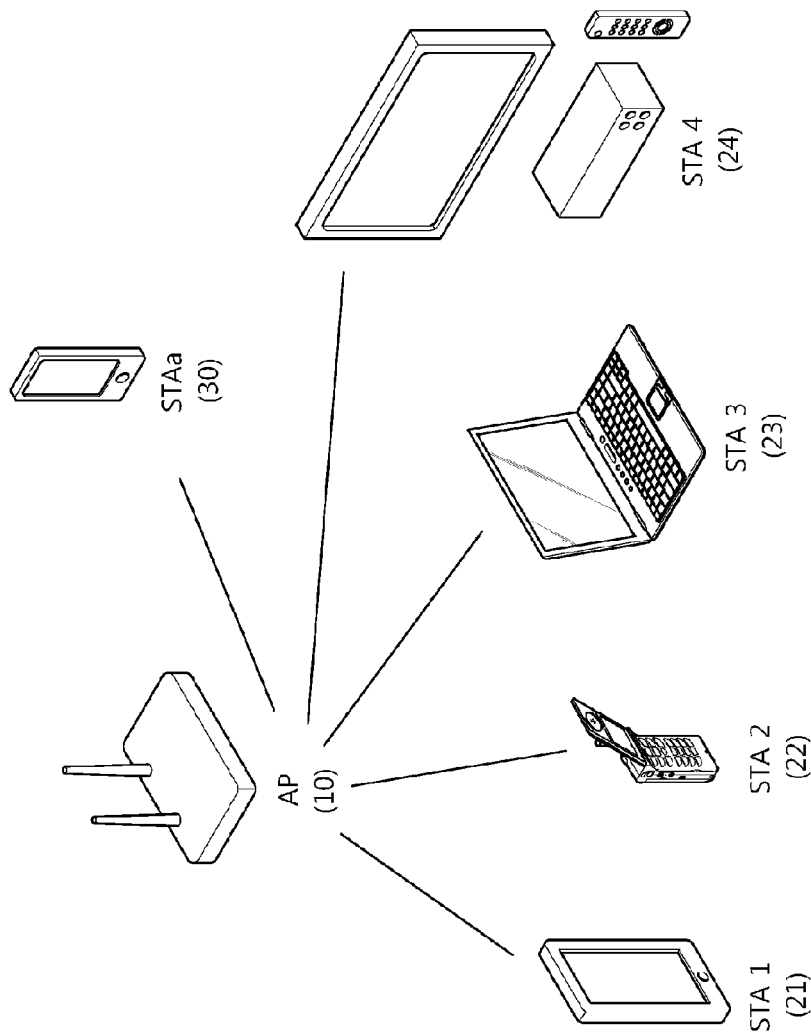
FIG. 1 is a diagram showing the configuration of a WLAN system to which embodiments of the present invention may be applied.

FIG. 1 is a diagram showing the configuration of a WLAN system to which embodiments of the present invention may be applied.

A WLAN system includes one or more Basic Service Set (BSSs). The BSS is a set of stations (STAs) which can communicate with each other through successful synchronization. The BSS is not a concept indicating a specific area An infrastructure BSS includes one or more non-AP STAs STA1, STA2, STA3, STA4, and STA5, an AP (Access Point) providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS shown in FIG. 1 can be interconnected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

The IEEE 802.11 MAC protocol, together with a Distributed Coordination Function (DCF), provides a Hybrid Coordination Function (HCF) based on a Point Coordination Function (PCF) of performing periodical polling by using the DCF and a polling-based synchronous access method so that all reception APs or STAs or both can receive data packets. The HCF includes contention-based Enhanced Distributed Channel Access (EDCA) and HCF Controlled Channel Access (HCCA) using a contention-free-based channel access scheme employing polling mechanism as access schemes used by a provider in order to provide data packets to a plurality of users. The HCF includes a medium access mechanism for improving Quality of Service (QoS) of a WLAN, and QoS data can be transmitted in both a Contention Period (CP) and a Contention-Free Period (CFP).

An AP or an STA or both may perform a procedure of exchanging a Request To Send (RTS) frame and Clear To Send (CTS) frame in order to inform access to a medium. Each of the RTS frame and the CTS frame includes information, indicating a scheduled time duration for accessing a radio medium which is necessary to transmit and receive substantial data frame and, if transmission and reception ACK is supported, an acknowledgement (ACK) frame. Another STA that has received an RTS frame from an AP or an STA or both trying to transmit frames or has received a CTS frame from a target STA to which a frame will be transmitted may be set not to access a medium during a time duration indicated by information included in the RTS/CTS frames. This may be implemented by setting a Network Allocation Vector (NAV) during the time duration.

Figure 2:
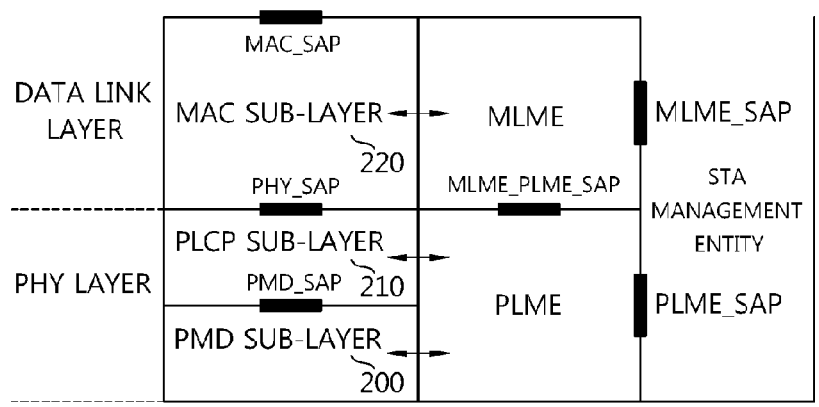
FIG. 2 is a diagram showing the PHY architecture of a WLAN system which is supported by IEEE 802.11.

FIG. 2 is a diagram showing the PHY architecture of a WLAN system which is supported by IEEE 802.11.

The PHY architecture of IEEE 802.11 includes a PHY Layer Management Entity (PLME), a Physical Layer Convergence Procedure (PLCP) sublayer 210, and a Physical Medium Dependent (PMD) sublayer 200. The PLME provides the management function of a physical layer in association with a MAC Layer Management Entity (MLME). The PLCP sublayer 210 transfers a MAC Protocol Data Unit (MPDU), received from a MAC sublayer 220, to the PMD sublayer 200 or transfers a frame, received from the PMD sublayer 200, to the MAC sublayer 220 according to an instruction of a MAC layer between the MAC sublayer 220 and the PMD sublayer 200. The PMD sublayer 200, as a PLCP sublayer, enables the transmission and reception of a physical entity between two STAs through a radio medium. The MPDU transmitted by the MAC sublayer 220 is referred to as a Physical Service Data Unit (PSDU) in the PLCP sublayer 210. The MPDU is similar to the PSDU, but if an Aggregated MPDU (A-MPDU) in which a plurality of MPDUs is aggregated is transferred, each MPDU and each PSDU may be different from each other.

In a process of transferring the PSDU, received from the MAC sublayer 220, to the PMD sublayer 200, the PLCP sublayer 210 adds a supplementary subfield, including information necessary for a physical transceiver, to the PSDU. The field added to the PSDU may include tail bits necessary to restore a PLCP preamble, a PLCP header, and a convolution encoder to a zero state. The PLCP sublayer 210 receives a TXVECTOR parameter, including control information necessary to generate and transmit a Physical Layer Convergence Procedure (PLCP) Protocol Data Unit (PPDU) and control information necessary for a receiving STA to receive and interpret the PPDU, from the MAC sublayer 220. The PLCP sublayer 210 uses the information included in the TXVECTOR parameter in order to generate the PPDU including the PSDU.

The PLCP preamble functions to enable a receiver to be prepared for a synchronization function and an antenna diversity before the PSDU is transmitted. A data field may include padding bits, a service field including a bit sequence for resetting a scrambler, and a coded sequence in which the bit sequence having tail bits added thereto has been encoded in the PSDU. Here, an encoding scheme may be either a Binary Convolutional Coding (BCC) encoding scheme or a Low Density Parity Check (LDPC) encoding scheme according to an encoding scheme supported by an STA that receives a PPDU. The PLCP header includes a field including information about a PLCP Protocol Data Unit (PPDU) to be transmitted. The PLCP header will be described in more detail later with reference to FIG. 3.

The PLCP sublayer 210 generates the PPDU by adding the field to the PSDU and transmits the generated PPDU to a receiving STA via the PMD sublayer 200. The receiving STA receives the PPDU, obtains information necessary to restore data from a PLCP preamble and a PLCP header, and restores the data. The PLCP sublayer of the receiving STA transfers an RXVECTOR parameter, including control information included in a PLCP preamble and a PLCP header, to an MAC sublayer so that the MAC sublayer can interpret the PPDU and obtain data in a reception state.

Unlike the existing WLAN system, the next-generation WLAN system requires a higher throughput which is called a Very High Throughput (VHT). To this end, the next-generation WLAN system tries to support 80 MHz bandwidth transmission, contiguous 160 MHz bandwidth transmission, non-contiguous 160 MHz bandwidth transmission or higher. Furthermore, an MU-MIMO transmission method is provided for a higher throughput. The AP of the next-generation WLAN system can transmit a data frame to one or more MIMO-paired STAs at the same time.

In a WLAN system, such as that shown in FIG. 1, an AP 10 can transmit data to an STA group, including at least one of a plurality of STAs 21, 22, 23, 24, and 30 associated therewith, at the same time. In a WLAN system, such as that shown in FIG. 1, the AP 10 may transmit data to an STA group including at least one STA, from among the plurality of STAs 21, 22, 23, 24, and 30 associated therewith, at the same time. An example where the AP performs MU-MIMO transmission to the STAs is shown in FIG. 1. In a WLAN system supporting Tunneled Direct Link Setup (TDLS), Direct Link Setup (DLS), or a mesh network, however, an STA trying to send data may send a PPDU to a plurality of STAs by using the MU-MIMO transmission scheme. An example where an AP sends a PPDU to a plurality of STAs according to the MU-MIMO transmission scheme is described below.

The data respectively transmitted to each of the STAs may be transmitted through different spatial streams. The data packet transmitted by the AP 10 may be a PPDU, generated and transmitted by the physical layer of a WLAN system, or a data field included in the PPDU, and the data packet may be referred to as a frame. In an example of the present invention, it is assumed that a target transmission STA group MU-MIMO-paired with the AP 10 includes the STA 1 21, the STA 2 22, the STA 3 23, and the STA 4 24. Here, data may not be transmitted to a specific STA of the target transmission STA group because spatial streams are not allocated to the specific STA. Meanwhile, it is assumed that the STAa 30 is associated with the AP 10, but not included in the target transmission STA group.

In order to support MU-MIMO transmission in a WLAN system, an identifier may be allocated to a target transmission STA group, and the identifier may be called a group ID. An AP transmits a group ID management frame, including group definition information, to STAs supporting MU-MIMO transmission in order to allocate a group ID to the STAs. The group ID is allocated to the STAs based on the group ID management frame prior to PPDU transmission. A plurality of group IDs may be allocated to one STA.

Table 1 below shows information elements included in the group ID management frame.

TABLE 1

| Order | Information |
|---|---|
| 1 | Category |
| 2 | VHT action |
| 3 | Membership status |
| 4 | Spatial stream position |

The frames of the category field and the VHT action field correspond to management frames. The category field and the VHT action field are set to identify that the relevant frames are group ID management frames used in the next-generation WLAN system supporting MU-MIMO.

As in Table 1, group definition information includes the membership status information, indicating whether an STA belongs to a specific group ID, and spatial stream position information indicating that what place is the spatial stream set of a relevant STA located from all the spatial streams according to MU-MIMO transmission if the STA belongs to the relevant group ID.

Since a plurality of group IDs is managed by one AP, membership status information provided to one STA needs to indicate whether the STA belongs to each of the group IDs managed by the AP. Accordingly, the membership status information may exist in an array form of subfields, indicating whether the STA belongs to each group ID. The spatial stream position information may exist in an array form of subfields, indicating a position of a spatial stream set occupied by an STA regarding each group ID, because the spatial stream position information indicates a position for each group ID. Furthermore, the membership status information and the spatial stream position information for one group ID may be implemented within one subfield.

If an AP transmits a PPDU to a plurality of STAs according to the MU-MIMO transmission scheme, the AP includes information, indicating a group ID, in the PPDU, and transmits the information as control information. When an STA receives the PPDU, the STA checks whether it is a member STA of a target transmission STA group by checking a group ID field. If the STA is checked to be a member of the target transmission STA group, the STA may check that what place is a spatial stream set, transmitted thereto, placed from all the spatial streams. Since the PPDU includes information about the number of spatial streams allocated to a reception STA, the STA can receive data by searching for spatial streams allocated thereto.

Figure 3:
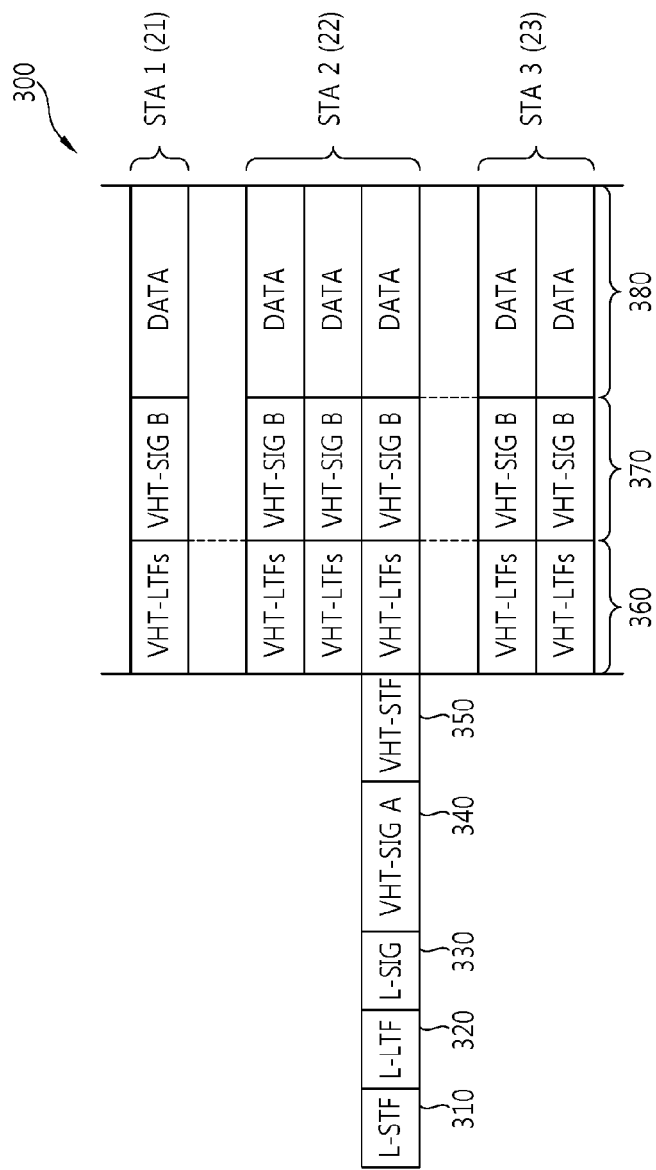
FIG. 3 is a diagram showing an example of a PPDU format used in a WLAN system.

FIG. 3 is a diagram showing an example of a PPDU format used in a WLAN system.

Referring to FIG. 3, a PPDU 300 may include an L-STF 310, an L-LTF 320, an L-SIG field 330, a VHT-SIG A field 340, a VHT-STF 350, a VHT-LTF 360, a VHT-SIG B field 370, and a data field 380.

The PLCP sublayer forming the physical layer converts a PSDU, received from the MAC layer, into the data field 380 by adding necessary information to the PSDU, generates the PPDU 300 by adding fields, such as the L-STF 310, the L-LTF 320, the L-SIG field 330, the VHT-SIG A field 340, the VHT-STF 350, the VHT-LTF 360, and the VHT-SIGB field 370, to the data field 380, and transmits the PPDU 300 to one or more STAs through the PMD sublayer forming the physical layer. Control information necessary for the PLCP sublayer to generate the PPDU and control information, included in the PPDU and transmitted so that a receiving STA can use the control information to interpret the PPDU, are provided from the TXVECTOR parameter received from the MAC layer.

The L-STF 310 is used for frame timing acquisition, Automatic Gain Control (AGC) convergence, coarse frequency acquisition, etc.

The L-LTF 320 is used for channel estimation for demodulating the L-SIG field 330 and the VHT-SIG A field 340.

The L-SIG field 330 is used for an L-STA to receive the PPDU 300 and obtain data by interpreting the PPDU 300. The L-SIG field 330 includes a rate subfield, a length subfield, parity bits, and a tail field. The rate subfield is set to a value indicating a bit rate for data to be transmitted now.

The length subfield is set to a value indicating the octet length of a Physical Service Data Unit (PSDU) that the MAC layer requests a physical layer to send the PSDU. Here, an L_LENGTH parameter related to information about the octet length of the PSDU is determined on the basis of a TXTIME parameter related to transmission time. TXTIME indicates a transmission time determined by the physical layer in order to transmit a PPDU including the PSDU, in response to a transmission time that the MAC layer has requested the physical layer to send the PSDU. Since the L_LENGTH parameter is a parameter related to time, the length subfield included in the L-SIG field 330 includes information related to the transmission time.

The VHT-SIG A field 340 includes control information (or signal information) necessary for STAs, receiving the PPDU 300, to interpret the PPDU 300. The VHT-SIG A field 340 is transmitted through two OFDM symbols. Accordingly, the VHT-SIG A field 340 may be divided into a VHT-SIG A1 field and a VHT-SIG A2 field. The VHT-SIG A1 field includes channel bandwidth information used for PPDU transmission, information indicating whether Space Time Block Coding (STBC) is used, information indicating a scheme for transmitting a PPDU, from among SU and MU-MIMO schemes, information indicating a target transmission STA group including a plurality of STAs that are MU-MIMO-paired with an AP if the transmission scheme is the MU-MIMO scheme, and information about spatial streams allocated to each STA of the target transmission STA group. The VHT-SIG A2 field includes short Guard Interval (GI)-related information.

The information indicating the MIMO transmission scheme and the information indicating the target transmission STA group may be implemented into a piece of MIMO indication information. For example, they may be implemented in the form of a group ID. The group ID may be set to a value having a specific range. A specific value of the range may indicate the SU-MIMO transmission scheme, and the remaining values of the range may be used as an identifier for a relevant target transmission STA group if the PPDU 300 is transmitted according to the MU-MIMO transmission scheme.

If the group ID indicates that the PPDU 300 is transmitted according to the SU-MIMO transmission scheme, the VHT-SIG A2 field includes coding indication information, indicating whether a coding scheme applied to a data field is a Binary Convolution Coding (BCC) scheme or a Low Density Parity Check (LDPC) coding scheme, and Modulation Coding Scheme (MCS) information about a channel between a sender and a recipient. Furthermore, the VHT-SIG A2 field may include the AID of an STA to which the PPDU 300 will be transmitted or a partial AID including some bit sequences of the AID or both.

If the group ID indicates that the PPDU 300 is transmitted according to the MU-MIMO transmission scheme, the VHT-SIG A field 340 includes coding indication information indicating whether a coding scheme applied to a data field to be transmitted to reception STAs that are MU-MIMO-paired is the BCC scheme or the LDPC coding scheme. In this case, Modulation Coding Scheme (MCS) information for each reception STA may be included in the VHT-SIG B field 370.

The VHT-STF 350 is used to improve AGC estimation performance in MIMO transmission.

The VHT-LTF 360 is used for an STA to estimate a MIMO channel. The VHT-LTF 360 may be set to the number corresponding to the number of spatial streams through which the PPDU 300 is transmitted because the next-generation WLAN system supports MU-MIMO. Additionally, full channel sounding is supported. If the full channel sounding is performed, the number of VHT-LTFs may be further increased.

The VHT-SIG B field 370 includes dedicated control information which is necessary for a plurality of MIMO-paired STAs to obtain data by receiving the PPDU 300. Accordingly, only when common control information included in the VHT-SIG B field 370 indicates that the received PPDU 300 has been subjected to MU-MIMO transmission, an STA may be designed to decode the VHT-SIG B field 370. On the other hand, if the common control information indicates that the received PPDU 300 is for a single STA (including SU-MIMO), an STA may be implemented not to decode the VHT-SIG B field 370.

The VHT-SIG B field 370 includes information about an MCS and information about rate matching for each STA. The VHT-SIG B field 370 further includes information indicating the length of a PSDU which is included in a data field for each STA. The information indicating the length of the PSDU is information indicating the length of the bit sequence of the PSDU and may be indicated by an octet unit. The size of the VHT-SIG B field 370 may vary an MIMO transmission type (MU-MIMO or SU-MIMO) and a channel bandwidth used for PPDU transmission.

The data field 380 includes data intended to be transmitted to an STA. The data field 380 includes a service field for resetting a PLCP Service Data Unit (PSDU) to which an MAC Protocol Data Unit (MPDU) in the MAC layer has been transferred and a scrambler, a tail field including a bit sequence necessary to restore a convolution encoder to a zero state, and padding bits for normalizing the length of a data field.

In a WLAN system, such as that shown in FIG. 1, if the AP 10 intends to transmit data to the STA 1 21, the STA 2 22, and the STA 3 23, the AP 10 may transmit the PPDU to an STA group including the STA 1 21, the STA 2 22, the STA 3 23, and the STA 4 24. In this case, the data may be transmitted in such a manner that spatial streams are not allocated to the STA 4 24 and a specific number of spatial streams are allocated to each of the STA 1 21, the STA 2 22, and the STA 3 23, as in FIG. 2. In the example of FIG. 2, it can be seen that one spatial stream has been allocated to the STA 1 21, three spatial streams have been allocated to the STA 2 22, and two spatial streams have been allocated to the STA 3 23.

One of the most important characteristics of the next-generation WLAN system is that it supports the MU-MIMO transmission scheme in which several spatial streams are transmitted to a plurality of STAs by using multiple antennas. In this case, the overall throughput of the system can be improved. In an environment including a plurality of STAs, an AP trying to transmit data transmits a Physical Layer Convergence Procedure (PLCP) Protocol Data Unit (PPDU) through a beamforming procedure so as to transmit the data to a target transmission STA group. Accordingly, an AP or an STA or both trying to transmit PPDUs using the MU-MIMO transmission scheme are required to perform channel sounding in order to obtain channel information about each target transmission STA.

Channel sounding for MU-MIMO may be initiated by a transmitter that tries to transmit a PPDU by forming a beam. The transmitter may be called a beamformer, and a receiver may be called a beamformee. In a WLAN system supporting Downlink (DL) MU-MIMO, an AP has a position of a transmitter (i.e., a beamformer) and initiates channel sounding. An STA has a position of a receiver (i.e., a beamformee), estimates a channel according to channel sounding initiated by an AP, and reports channel information. In describing a detailed channel sounding method hereinafter, channel sounding in DL MU-MIMO transmission is assumed. The following channel sounding method may be applied to a wireless communication system supporting common MU-MIMO transmission.

Channel sounding in the next-generation WLAN system is performed on the basis of a Null Data Packet (NDP). The NDP has a PPDU format without a data field. An STA performs channel estimation on the basis of the NDP and feeds channel state information (i.e., the result of the estimation) back to an AP. The NDP may be called a sounding frame. Channel sounding based on the NDP is described with reference to FIG. 4.

Figure 4:
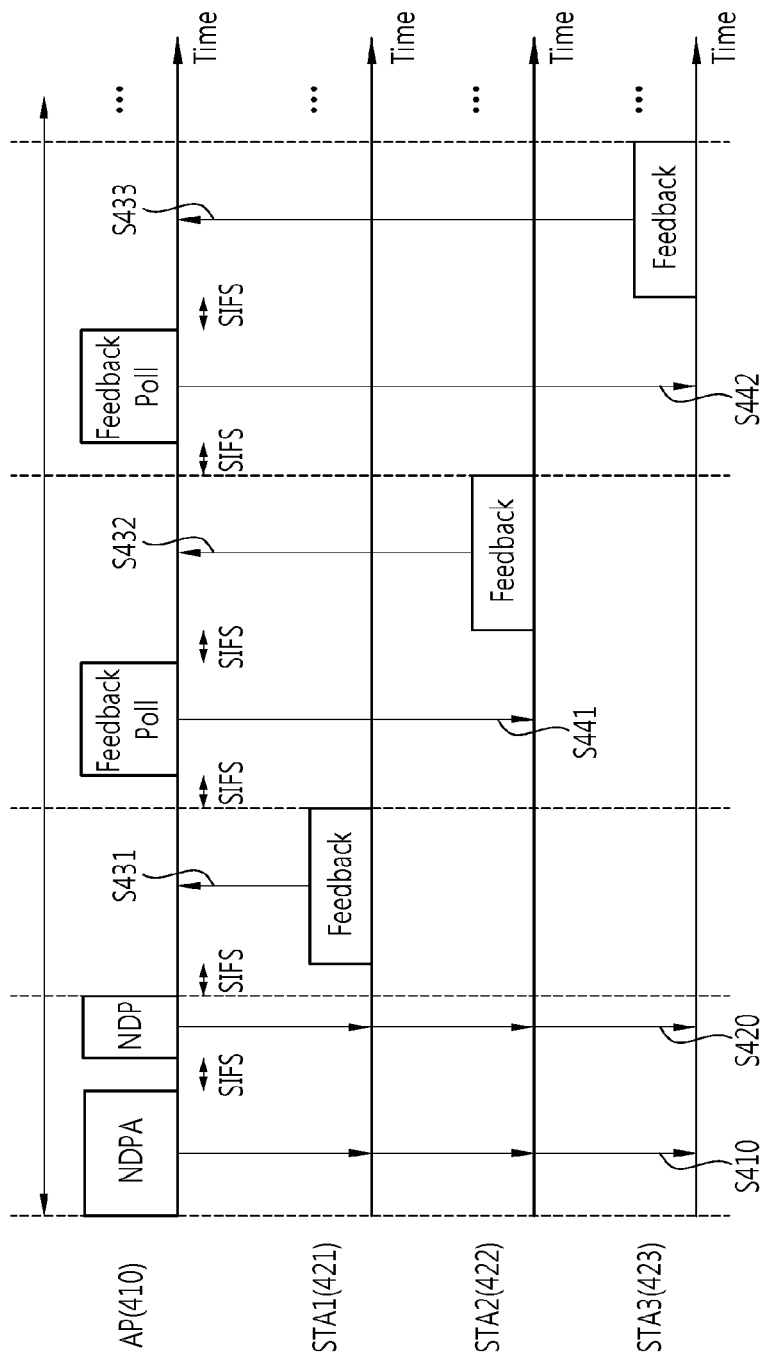
FIG. 4 is a diagram showing a channel sounding method using an NDP in the next-generation WLAN system.

FIG. 4 is a diagram showing a channel sounding method using an NDP in the next-generation WLAN system. In this example, an AP 410 performs channel sounding on three target transmission STAs 421, 422, and 423 in order to transmit data to the three target transmission STAs. In some embodiments, the AP may perform channel sounding on one STA.

Referring to FIG. 4, the AP 410 transmits an NDP Announcement (NDPA) frame to the STA1 421, the STA2 422, and the STA3 423 at step S410. The NDPA frame informs that channel sounding will be initiated and an NDP will be transmitted. The NDPA frame may be called a sounding announcement frame.

The NDPA frame includes information for identifying an STA which will estimate a channel and transmit a feedback frame, including channel state information, to an AP. In other words, the STA determines whether it is an STA participating in channel sounding by receiving the NDPA frame. Accordingly, the AP 410 includes an STA information field, including information about a target sounding STA, in the NDPA frame and then transmits the NDPA frame. The STA information field may be included for every target sounding STA.

This is for informing information for identifying an STA that will transmit a feedback frame in response to a next transmitted NDP.

If the NDPA frame is transmitted to one or more target STAs for MU-MIMO channel sounding, the AP 410 broadcasts the NDPA frame. If the NDPA frame is transmitted to one target STA for SU-MIMO channel sounding, the AP 410 may set receiver address information about the NDPA frame as the MAC address of the target STA and transmit the NDPA frame in a unicast manner.

Table 2 shows an example of STA information field formats included in the NDPA frame.

TABLE 2

| Subfield | Description |
| --- | --- |
| AID | Contains the AID of the STA expected to process the following NDP frame and prepare the sounding feedback. |
| Feedback type | Indicates the type of feedback requested. Set to 0 for SU. Set to 1 for MU. |
| Nc index | Nc Index Indicates the feedback dimension requested if the Feedback Type field is 1: Set to 0 to request Nc = 1 Set to 1 to request Nc = 2 ... Set to 7 to request Nc = 8 Reserved if the Feedback Type field is 0. |

In Table 1, Nc indicates the number of columns of a beamforming feedback matrix from feedback information transmitted to an AP in response to an NDP frame by a target sounding STA that has received the NDP frame.

STAs that have received an NDPA frame may check whether they are target sounding STAs by checking an AID subfield value included in an STA information field. In an embodiment, such as that shown in FIG. 4, the NDPA frame may include an STA information field including the AID of the STA1 421, an STA information field including the AID of the STA2 422, and an STA information field including the AID of the STA3 423.

After transmitting the NDPA frame, the AP 410 transmits an NDP frame to the target STAs at step S420. The NDP frame may have a format having a data field omitted from a PPDU format, such as that shown in FIG. 3. The AP 410 precodes the NDP frame on the basis of a specific precoding matrix and transmits the NDP frame to the target sounding STAs. Accordingly, the target sounding STAs 421, 422, and 423 estimate channels on the basis of the VHT-LTF of the NDP and obtain channel state information.

As pieces of control information included in the NDP frame when the NDP frame is transmitted, length information, indicating the length of a PSDU included in a data field or the length of an Aggregate-MAC Protocol Data Unit (A-MPDU) included in the PSDU, is set to 0, and information indicating the number of target transmission STA to which the NDP frame will be transmitted is set to 1. Furthermore, a group ID, indicating whether a transmission scheme used to transmit the NDP frame is MU-MIMO or SU-MIMO and a target transmission, is set as a value indicating SU-MIMO transmission. Information indicating the number of spatial streams allocated to a target transmission STA is set to indicate the number of spatial streams transmitted to the target transmission STA through MU-MIMO or SU-MIMO. Information about a channel bandwidth used to transmit the NDP frame may be set as a bandwidth value used to transmit the NDPA frame.

The STA1 421 transmits a feedback frame to the AP 410 at step S431. A channel bandwidth used to transmit the feedback frame may be set to be narrower than or equal to the channel bandwidth used to transmit the NDPA frame.

After receiving the feedback frame from the STA1 421, the AP 410 transmits a feedback poll frame to the STA2 422 at step S441. The feedback poll frame is a frame for requesting a receiving STA to transmit a feedback frame. The feedback poll frame is transmitted to an STA that will be requested to transmit a feedback frame in a unicast manner. The STA2 422 that has received the feedback poll frame transmits a feedback frame to the AP 410 at step S432. Next, the AP 410 transmits a feedback poll frame to the STA3 423 at step S442. The STA3 423 transmits a feedback frame to the AP 410 in response to the feedback poll frame at step S433.

In a WLAN system, a channel bandwidth used to transmit data may be various. In order to estimate channels for various bandwidths, pieces of channel information for the various bandwidths may be fed back. The next-generation WLAN system supports 20 MHz, 40 MHz, 80 MHz, contiguous 160 MHz, and non-contiguous 160 MHz (80+80) MHz bandwidths. Accordingly, the amount of channel feedback information may be increased because pieces of channel information about the bandwidths are fed back.

In the present invention, channel state information according to channel estimation performed by an STA is included in a feedback frame transmitted from the STA to an AP and then transmitted. The channel state information of the feedback frame may be implemented using a channel information field and a channel information control field. Table 3 and Table 4 below show the formats of the channel information control field and the channel information field.

TABLE 3

| Subfield | Description |
| --- | --- |
| Nc index | Indicate the number of columns of a beamforming feedback matrix when Nc = 1, 0 when Nc = 2, 1 ... when Nc = 8, 7 |
| Nr index | Indicate the number of rows of a beamforming feedback matrix when Nr = 1, 0 when Nr = 2, 1 ... when Nr = 8, 7 |
| Channel bandwidth | Indicate the bandwidth of an estimated channel when 20 MHz, 0 when 40 MHz, 1 when 80 MHz, 2 when 160 MHz or 80 + 80 MHz, 3 |

TABLE 3-continued

| Subfield | Description |
| --- | --- |
| Grouping (Ng) | Indicate the number of carriers for grouping<br>when Ng = 1, 0<br>when Ng = 2, 1<br>when Ng = 4, 2<br>(3 is set for reservation) |
| Codebook information | Indicate the size of codebook entries |
| MU-scheme | Indicate whether it is for beamforming feedback for SU-MIMO or MU-MIMO |
| Sounding sequence | Indicate a sequence number from an NPDA frame requesting a feedback |

TABLE 4

| Subfield | Description |
| --- | --- |
| Signal to Noise Ratio (SNR) of a spatial stream 1 | An average SNR on subcarriers in a receiver for the first spatial stream |
| ... | ... |
| SNR of a spatial stream Nc | An average SNR on subcarriers in a receiver for the $Nc^{th}$ spatial stream |
| Beamforming feedback matrix (subcarrier index 0) | Order of an angle of a beamforming feedback matrix for a relevant subcarrier |
| Beamforming feedback matrix (subcarrier index 1) | Order of an angle of a beamforming feedback matrix for a relevant subcarrier |
| ... | ... |
| Beamforming feedback matrix (subcarrier index Ns) | Order of an angle of a beamforming feedback matrix for a relevant subcarrier |

The pieces of information about the channel information fields listed in Table 4 may be interpreted on the basis of the pieces of information included in the channel control field listed in Table 3.

Meanwhile, in a WLAN system supporting MU-MIMO, when channel sounding is initiated on the basis of an NDP frame, a target sounding STA may do not normally receive the NDP frame. In this case, the target sounding STA cannot transmit a feedback frame, including channel state information, to an AP because it cannot normally perform channel sounding on the basis of the NDP frame. In this case, the AP newly initiates channel sounding.

Initiating channel sounding again as described above may cause a problem in channel sounding for MU-MIMO. In channel sounding applied to a plurality of target sounding STAs, if channel sounding is not normally performed by one STA, inefficiency is problematic because overall channel sounding has to be separately performed again. The present invention proposes a channel sounding method capable of improving inefficiency in channel sounding due to problems occurring in the transmission and reception of an NDP frame.

While an AP performs channel sounding, a wireless channel environment may be changed owing to lots of factors, such as signal fading and an interference signal. Accordingly, an STA has received an NDPA frame including information indicating that the STA itself is a target sounding STA, but may not normally receive an NDP frame transmitted subsequently to the NDPA frame. Whether the NDP frame has been normally received may be determined by the CRC of an L-SIG field or a VHT-SIGA field or may be determined by whether a specific agreed bit sequence used in the VHT-SIGB field of the NDP frame has been normally received. The STA has normally received a radio signal for the NDP frame, but may fail in the demodulation of the NDP frame. In this case, the STA cannot estimate a channel and obtain channel state information because it cannot obtain the number of spatial streams allocated thereto and information related to a bandwidth.

The present invention proposes a method of transmitting an additional frame in order to inform that the STA does not have channel state information to be fed back to an AP, unlike in the existing method of not transmitting any frame. If an AP does not receive a feedback frame in expected timing, the AP transmits an NDPA frame in order to start new channel sounding.

If an STA that does not feed channel state information back to an AP is designated as an STA that will transmit a feedback frame to the AP for the first time in response to an NDPA frame, the AP transmits the NDPA frame in order to initiate new channel sounding. In this case, inefficiency is further increased because pieces of channel state information obtained by other STAs through channel estimation are disused. Accordingly, as the remaining channel sounding procedure is performed, the STA may transmit a null feedback frame, not including channel state information, to the AP. This is described in detail with reference to FIG. 5.

Figure 5:
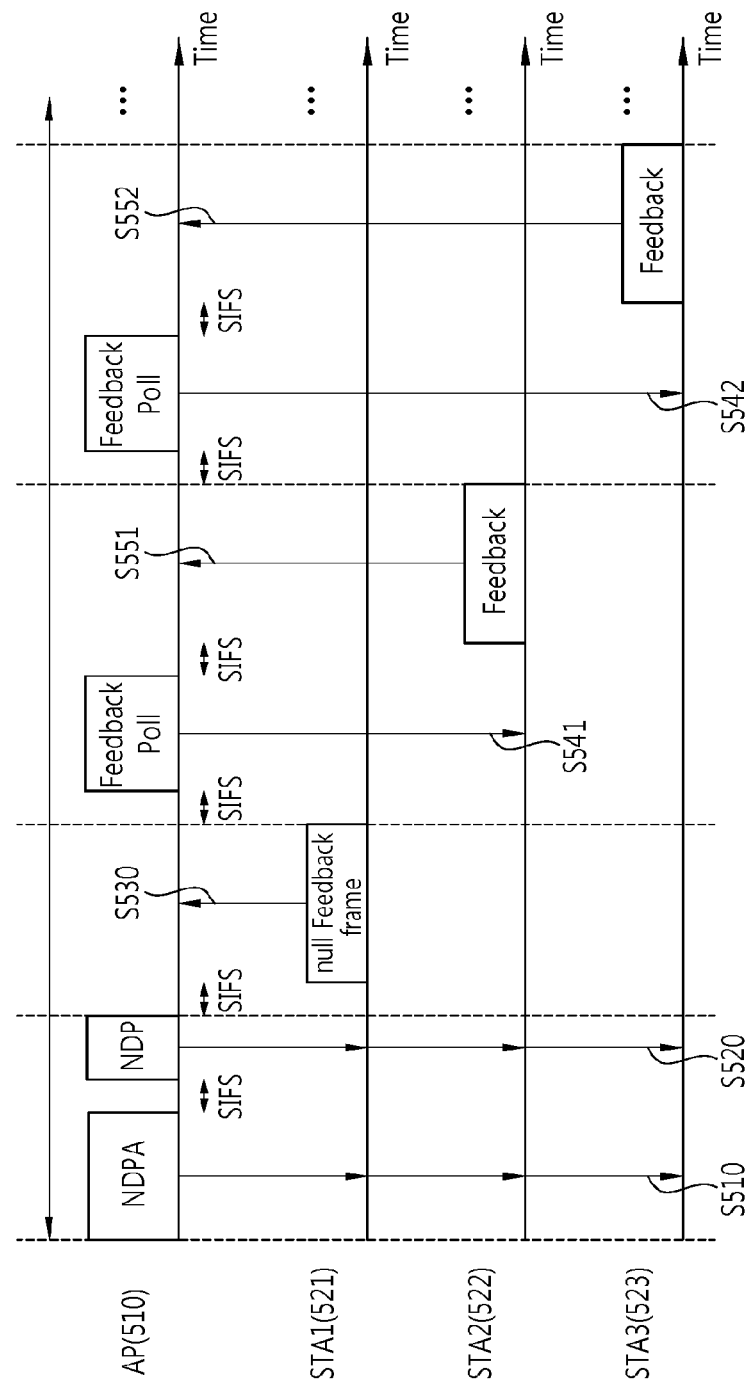
FIG. 5 is a diagram showing a channel sounding method according to an embodiment of the present invention.

FIG. 5 is a diagram showing a channel sounding method according to an embodiment of the present invention.

Referring to FIG. 5, an AP 510 transmits an NDPA frame at step S510 and then transmits an NDP frame at step S520. The steps S510 and S520 are the same as those of the steps S410 and S420 of FIG. 4, and a detailed description thereof is omitted.

It is assumed that an STA1 521 has not normally received the NDP frame. The STA1 521 cannot obtain channel state information through channel estimation. Accordingly, the STA1 521 transmits a null feedback frame, not including channel state information, to the AP 510 at step S530.

The STA1 521 may do not obtain information necessary to transmit the null feedback frame because it has not normally received the NDP frame. Accordingly, the present invention proposes a method in which an STA refers to an NDPA frame transmitted earlier than an NDP frame in order to obtain information necessary to transmit a null feedback frame although the STA has not normally received the NDP frame. The STA1 521 may obtain information necessary to transmit the null feedback frame on the basis of information obtained by receiving the NDPA frame.

An example in which the STA1 521 has not normally received the NDP frame may include a case where the STA1 521 has not decoded a VHT-SIGA field included in the NDP frame. The STA1 521 cannot know information about a channel bandwidth and information about the number of allocated spatial streams. Meanwhile, the STA1 521 may analogize the total length of the NDP frame based on length information about the L-SIG field of the NDP frame. Accordingly, the STA1 521 may know that a point of time at which the transmission of a feedback frame was finished is from a point of time at which the AP finished transmitting the NDP frame to a point of time after a Short InterFrame Space (SIFS). The point of time at which the transmission of a feedback frame was finished is different from a point of time at which an STA having a lower priority, such as an STA2 522 and an STA3 523, transmits a feedback frame and at which the transmission of the feedback frame is determined in response to a feedback poll frame.

A channel bandwidth used to transmit the NDP frame is equal to a channel bandwidth used to transmit the NDPA frame. Accordingly, a bandwidth used to transmit a null feedback frame may be determined based on the parameter CH_BANDWIDTH of RXVECTOR (i.e., an information parameter obtained by receiving the NDPA frame transmitted earlier than the NDP frame). The STA1 521 may determine a bandwidth for transmitting the null feedback frame and set the parameter CH_BANDWIDTH of TXVECTOR (i.e., a transmission information parameter).

As described above, the STA1 521 can transmit the null feedback frame because it can determine timing when the null feedback frame is transmitted and the parameter CH_BANDWIDTH although the STA1 521 has not normally received the NDP frame.

The AP 510 does not initiate new channel sounding and performs the remaining channel sounding for the STA2 522 and the STA3 523 because the AP 510 has not received channel state information from the STA1 521, but has received the null feedback frame therefrom.

After receiving the null feedback frame from the STA1 521, the AP 510 transmits a feedback poll frame to the STA2 522 at step S541. The feedback poll frame is a frame that requests a receiving STA to transmit a feedback frame. The feedback poll frame is transmitted to an STA that will be requested to transmit the feedback frame in a unicast manner. The STA2 522 that has received the feedback poll frame transmits a feedback frame to the AP 510 at step S551. Next, the AP 510 transmits a feedback poll frame to the STA3 523 at step S542. In response to the feedback poll frame, the STA3 523 transmits a feedback frame to the AP 510 at step S552.

In addition, if the feedback frame is not received from the STA1 521, the AP 510 may selectively request channel state information from the remaining STAs or perform a procedure of starting a new channel sounding procedure.

Meanwhile, in a WLAN according to the IEEE 802.11 standard, frames may be classified into three types; a data frame, a control frame, and a management frame. In general, when a control frame is transmitted in response to a specific received frame, the same bandwidth as a bandwidth spanned by the received control frame is spanned and transmitted.

In a system using an Industrial, Scientific, and Medical (ISM) band as opportunity permits, interference not known to a transmitter may exist on the receiver side. In particular, in a wide frequency band, systems access channels while coexisting in various communication systems and operate using different bandwidth configurations. In this case, a frequency selective and strong interference signal may be detected by a receiver, but may not be detected by a transmitter.

The present invention proposes a protocol in which in channel sounding, an AP transmits an NDPA frame and an NDP frame and STAs transmit feedback frames through a bandwidth which is smaller than or equal to a bandwidth used to transmit the NDPA frame and the NDP frame.

Figure 6:
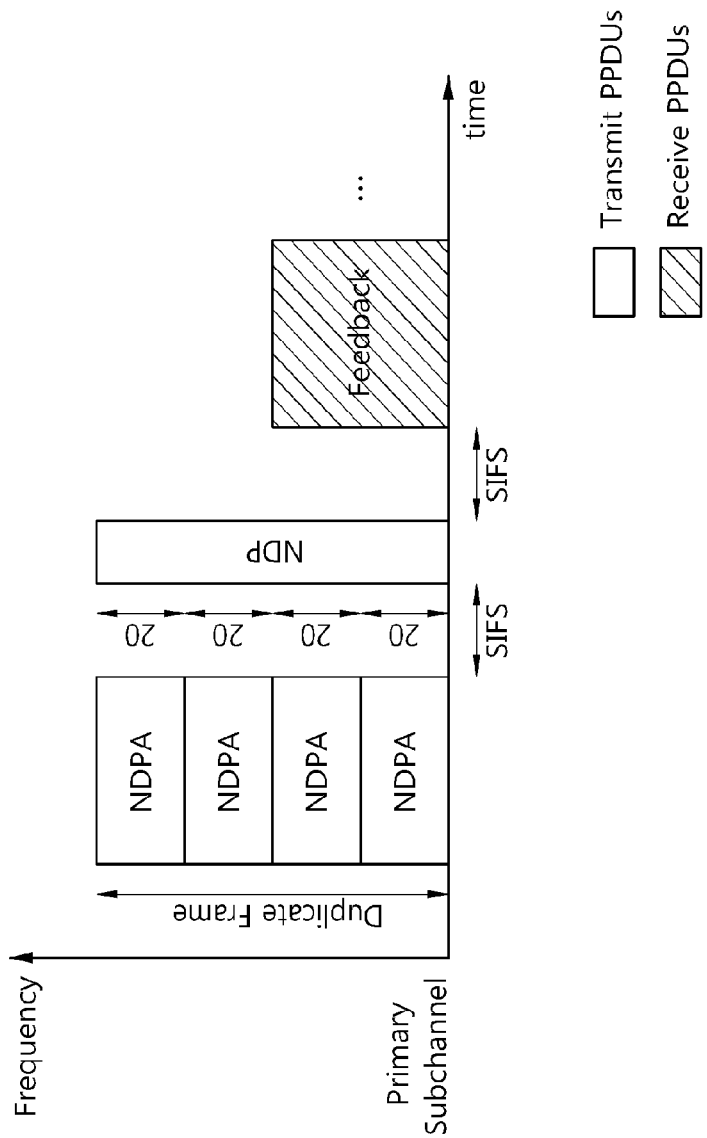
FIG. 6 is a diagram showing another example in which a channel to which an embodiment of the present invention may be applied is used.

FIG. 6 is a diagram showing another example in which a channel to which an embodiment of the present invention may be applied is used. FIG. 6 is an example in which a channel is used from a viewpoint of a beamformer, such as an AP.

Referring to FIG. 6, an NDPA frame includes a primary subchannel, and the NDPA frame is transmitted through four subchannels each having a 20 MHz bandwidth. The NDPA frame is transmitted according to a duplicate frame structure. Accordingly, although an AP transmits the NDPA frame by spanning a large bandwidth, an STA can normally decode and understand the NDPA frame only if the STA normally receives only some bands.

The AP transmits the NDP frame by spanning a bandwidth based on a bandwidth spanned for the transmission of the NDPA frame.

The AP receives a feedback frame through a bandwidth narrower than the bandwidth spanned for the transmission of the NDPA frame and the NDP frame.

Figure 7:
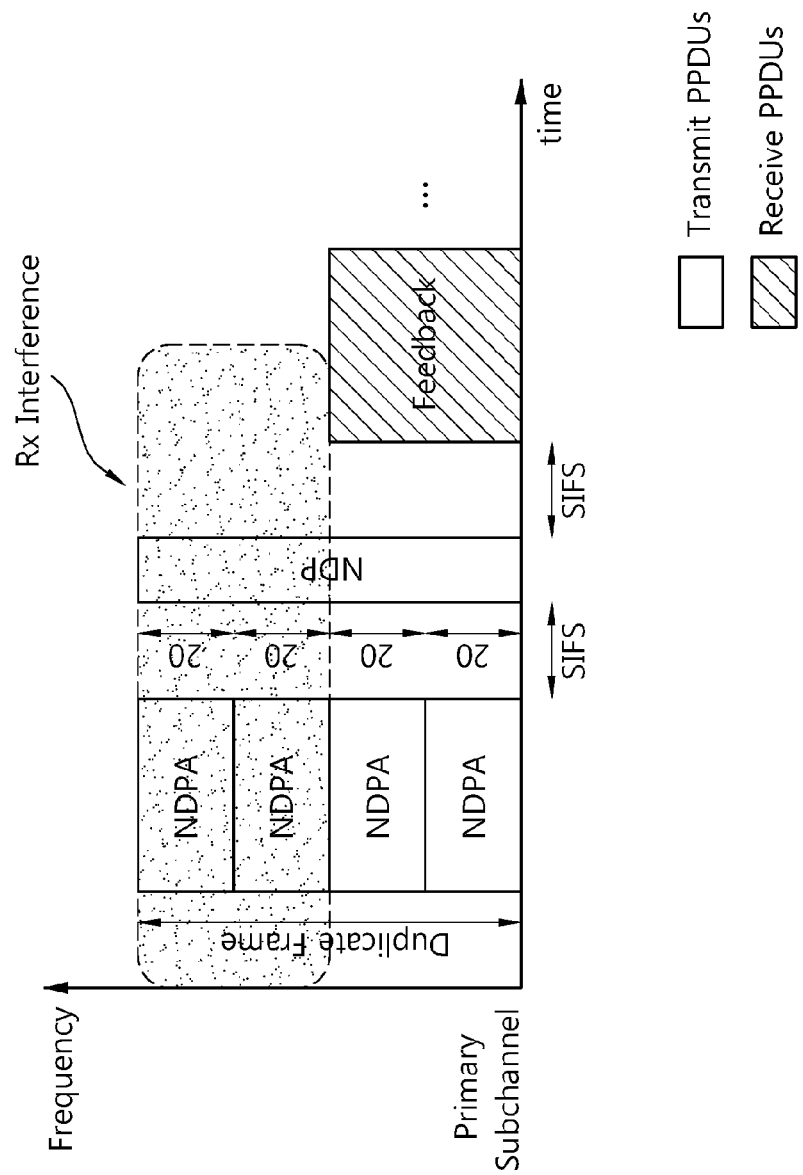
FIG. 7 is a diagram showing yet another example in which a channel to which an embodiment of the present invention may be applied is used.

FIG. 7 is a diagram showing yet another example in which a channel to which an embodiment of the present invention may be applied is used.

Referring to FIG. 7, an NDPA frame and an NDP frame are transmitted according to a duplicate frame structure through four subchannels which is a total 80 MHz bandwidth. However, interference at a receiving stage (Rx interference) was generated in a specific 40 MHz bandwidth from the total 80 MHz bandwidth through which the NDPA frame and the NDP frame are transmitted.

In this case, an STA can decode the NDPA frame per 20 MHz because the NDPA frame is transmitted according to the duplicate frame structure. If the STA has decoded the NDPA frame for a specific bandwidth, the STA can perform channel estimation on the specific bandwidth and transmit a feedback frame although the NDP frame is received through an original channel band intended by an AP. In case of FIG. 7, the STA performs channel estimation for the 40 MHz bandwidth and generates channel state information.

In addition, the present invention proposes a method in which an STA includes channel estimation information in a feedback frame and transmits the feedback frame if a primary subchannel is included in a bandwidth through which the STA normally receives an NDPA frame or an NDP frame or both in transmitting the feedback frame. Furthermore, when transmitting the feedback frame, the STA may use a bandwidth through which the NDPA frame or the NDP frame or both have been normally received.

In this channel sounding, although the NDPA frame is transmitted according to a duplicate frame structure, the STA may need information about a bandwidth used to transmit the NDPA frame. The information about the bandwidth may be included in the service field of a data field. In some embodiments, the information about the bandwidth may be included in the frame body of the NDPA frame itself and then transmitted.

Meanwhile, if channel sounding is performed on a plurality of STAs, a bandwidth supported by each of the STAs may be different. Furthermore, an AP which has received a feedback frame from the first STA may want to control a bandwidth through which channel state information for another bandwidth or a feedback frame or both are transmitted in relation to the remaining STAs. In this case, information related to a maximum bandwidth through which the feedback frame can be transmitted or maximum bandwidth information related to channel state information or both may be included in an NDPA frame or a feedback poll frame or both. The information related to a maximum bandwidth through which the feedback frame can be transmitted may be implemented by setting the service field of the data field of a PPDU. The maximum bandwidth information related to channel estimation for channel state information may be implemented by adding the fields of an NDPA frame or a feedback poll frame or both.

Figure 8:
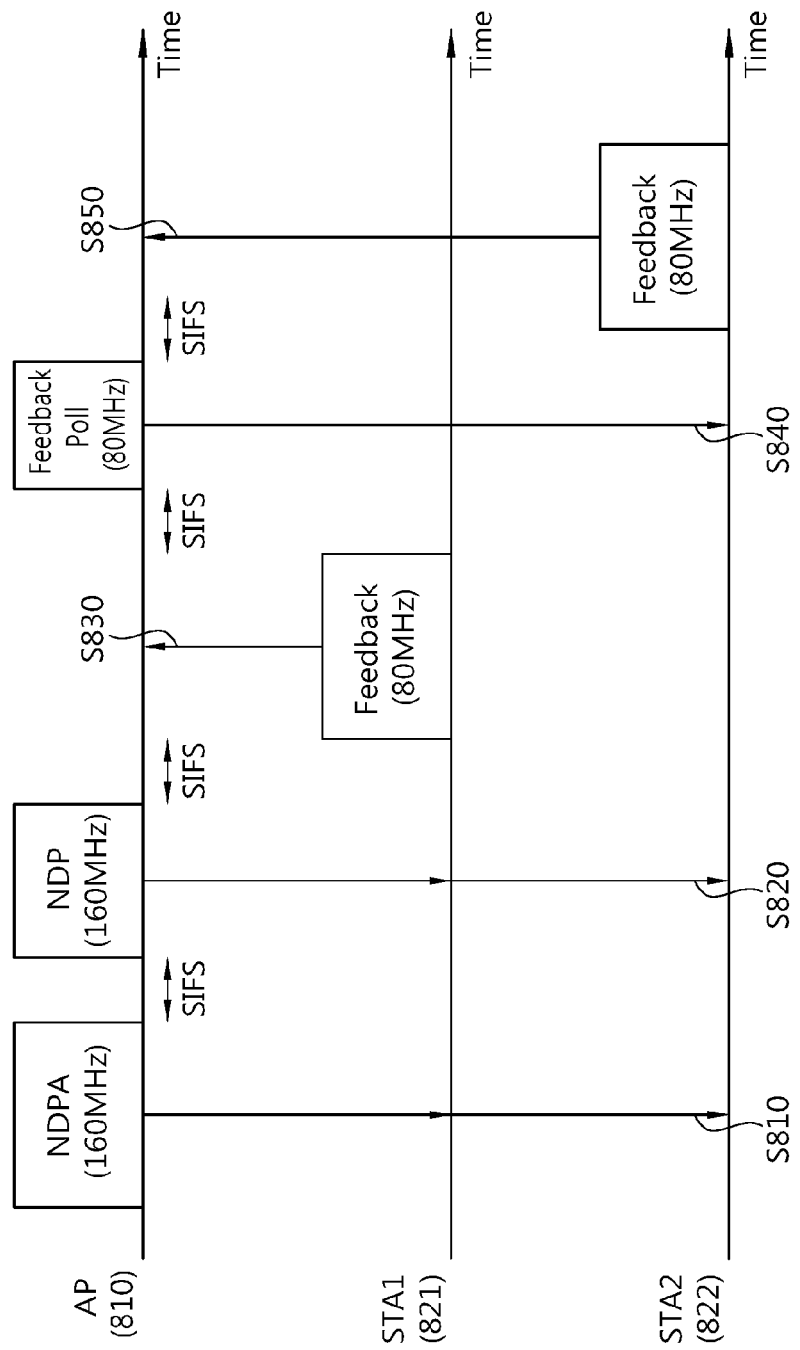
FIG. 8 is a diagram showing an example of channel sounding according to an embodiment of the present invention.

FIG. 8 is a diagram showing an example of channel sounding according to an embodiment of the present invention. It is assumed that an STA1 821 is an STA that transmits a feedback frame with the first priority.

Referring to FIG. 8, an AP 810 transmits an NDPA frame to the STA1 821 and an STA2 822 at step S810. Next, the AP 810 transmits a NDP frame to the STA1 821 and the STA2 822 at step S820. The NDPA frame is transmitted according to a duplicate frame structure while spanning a 160 MHz bandwidth. The NDP frame is also transmitted while spanning a 160 MHz bandwidth.

The NDPA frame includes information that the NDPA frame spans the 160 MHz bandwidth. It is assumed that when receiving the NDPA frame, the STA1 821 has not normally received the NDPA frame for the entire 160 MHz bandwidth, but has normally received the NDPA frame for an 80 MHz bandwidth, including a primary subchannel, because interference has occurred in a specific band including a non-primary subchannel.

The STA1 810 performs channel estimation based on the NDP frame for the 80 MHz bandwidth and feeds channel state information about the 80 MHz bandwidth back to the AP 810 at step S830. At this time, the feedback frame including the channel state information may be transmitted through the 80 MHz bandwidth.

In order to receive channel state information from the STA2 822, the AP 810 transmits a feedback poll frame to the STA2 822 at step S840. In order to limit a bandwidth through which the feedback frame of the STA2 822 is transmitted, the AP 810 may include information about channel estimation for the 80 MHz bandwidth in the feedback poll frame.

The STA2 822 performs channel estimation on the 80 MHz bandwidth indicated by the information included in the feedback poll frame and transmits the feedback frame, including channel state information, to the AP 810 at step S850. A bandwidth used to transmit the feedback frame may be the bandwidth determined to be available for the STA2 822. If the STA2 822 has normally received the NDPA frame and the NDP frame through the 160 MHz bandwidth, the STA2 822 may transmit the feedback frame by using the 160 MHz bandwidth. If the STA2 822 has normally received the NDPA frame for only the 80 MHz bandwidth like the STA1 821, the STA2 822 may transmit the feedback frame by using the 80 MHz bandwidth. If maximum bandwidth information for transmitting the feedback frame is included in the received feedback poll frame, the STA2 822 may transmit the feedback frame by using a bandwidth smaller than or equal to the maximum bandwidth on the basis of maximum bandwidth information.

If STAs feed back channel state information about a bandwidth smaller than a bandwidth through which an NDPA frame or an NDP frame or both are transmitted, each STA may include information indicative of a reason in a feedback frame and transmit the feedback frame. The information indicative of the reason is a reason code and may be implemented by informing the reason code using previously agreed information. The reason code may be given as in Table 5 below.

TABLE 5

| Reason Code | Description |
| --- | --- |
| ... | ... |
| 52 | Partial bandwidth Sounding feedback due to CCA busy (Energy Detection) on non-primary subchannel |
| 53 | Partial bandwidth Sounding feedback due to CCA busy (Valid 802.11 signal) on non-primary subchannel |
| 54 | Partial bandwidth Sounding feedback due to miss-detection of non-primary subchannels of the NDPA and the NDP |
| 55 | Partial bandwidth Sounding feedback due to un-supported Sounding BW |
| ... | ... |

In addition, if the reason code indicates that a channel occupancy state (i.e., a CCA busy state) has been detected in a subchannel, such as 20, 40, 80, 160, or 80+80 MHz, or that an NDPA frame or an NDP frame has not been normally received, an STA may include information indicative of a relevant subchannel in a feedback frame and transmit the feedback frame. Furthermore, if a CCA busy state is detected or an NDPA frame or an NDP frame or both is not normally received, detailed information about a relevant reason may be further included in the feedback frame. For example, whether an energy detection CCA busy state has continued before an NDPA frame is received, whether a valid 802.11 signal CCA busy state has continues before an NDPA frame is received, or whether an NDPA frame or an NDP frame or both have not been received and decoded in a specific subchannel when they are received may be classified and informed.

Figure 9:
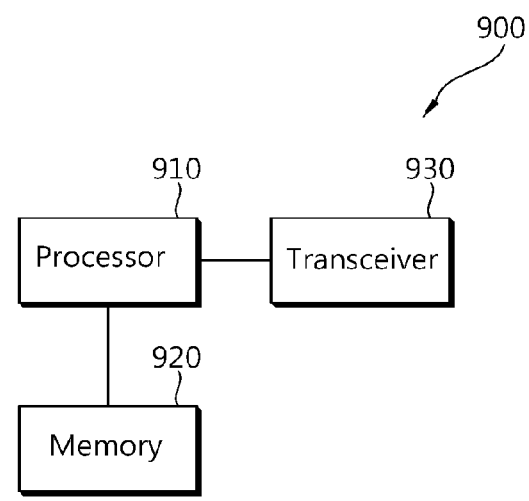
FIG. 9 is a block diagram showing a wireless apparatus to which the embodiments of the present invention may be applied.

FIG. 9 is a block diagram showing a wireless apparatus to which the embodiments of the present invention may be applied. The wireless apparatus may be an AP or an STA.

The wireless apparatus 900 includes a processor 910, memory 920, and a transceiver 930. The transceiver 930 transmits and receives radio signals, and the physical layer of IEEE 802.11 is implemented in the transceiver 930. The processor 910 is functionally coupled to the transceiver 930, and it implements the MAC layer and the physical layer of IEEE 802.11. The processor 910 may be set to generate and transmit the NDPA frame, the NDP frame, and the feedback poll frame proposed by the present invention and may also be set to receive a transmitted frame and obtain channel estimation information and channel state information by interpreting a field value included in the frame. The processor 910 may be set to feed back the channel estimation information and the channel state information through a specific bandwidth on the basis of information included in the NDPA frame or the NDP frame or both. The processor 910 may be set to perform subsequent channel sounding according to a received feedback frame. The processor 910 may be set to implement the embodiments of the present invention described above with reference to FIGS. 4 and 8.

The processor 910 and/or the transceiver 930 may include an application-specific integrated circuit (ASIC), a separate chipset, a logic circuit, and/or a data processing unit. When the embodiment of the present invention is implemented in software, the aforementioned methods can be implemented with a module (i.e., process, function, etc.) for performing the aforementioned functions. The module may be stored in the memory 920 and may be performed by the processor 910. The memory 920 may be located inside or outside the processor 910, and may be coupled to the processor 910 by using various well-known means.

The invention claimed is:

1. A method for channel sounding in a wireless local area network, the method comprising:

transmitting, by a station, a 20 MHz null data packet announcement (NDPA) frame and at least one duplicate 20 MHz NDPA frame, the at least one duplicate 20 MHz NDPA frame being a duplicate of the 20 MHz NDPA frame;

transmitting, by the station, a null data packet (NDP) following the 20 MHz NDPA frame and the at least one duplicate 20 MHz NDPA frame, wherein a bandwidth over which the 20 MHz NDPA frame and the at least one duplicate 20 MHz NDPA frame are transmitted is same as a bandwidth over which the NDP is transmitted; and in response to at least one of the 20 MHz NDPA frame or the at least one duplicate 20 MHz NDPA frame, receiving, by the station, a report frame, wherein the 20 MHz NDPA frame and the at least one duplicate 20 MHz NDPA frame comprise bandwidth information indicating the bandwidth over which the 20 MHz NDPA frame and the at least one duplicate 20 MHz NDPA frame are transmitted.

2. The method of claim 1,
wherein the 20 MHz NDPA frame and the at least one duplicate 20 MHz NDPA frame comprise a signal field and a data field, and
wherein the bandwidth information is included in the signal field.

3. The method of claim 1,
wherein the report frame comprises information about a beamforming feedback matrix and information about a channel used to create the beamforming feedback matrix.

4. A station configured to perform channel sounding in a wireless local area network, the station comprising:
a transceiver configured to transmit and receive signals; and
a processor operatively connected to the transceiver and configured to:
transmit a 20 MHz null data packet announcement (NDPA) frame and at least one duplicate 20 MHz NDPA frame, the at least one duplicate 20 MHz NDPA frame being a duplicate of the 20 MHz NDPA frame,
transmit a null data packet (NDP) following the 20 MHz NDPA frame and the at least one duplicate 20 MHz NDPA frame,
wherein a bandwidth over which the 20 MHz NDPA frame and the at least one duplicate 20 MHz NDPA frame are transmitted is same as a bandwidth over which the NDP is transmitted, and
in response to at least one of the 20 MHz NDPA frame or the at least one duplicate 20 MHz NDPA frame, receive a report frame,
wherein the 20 MHz NDPA frame and the duplicate 20 MHz NDPA frame comprise bandwidth information indicating the bandwidth over which the 20 MHz NDPA frame and the at least one duplicate 20 MHz NDPA frame are transmitted.

5. The station of claim 4,
wherein the 20 MHz NDPA frame and the at least one duplicate 20 MHz NDPA frame comprise a signal field and a data field, and
wherein the bandwidth information is included in the signal field.

6. The station of claim 4,
wherein the report frame comprises information about a beamforming feedback matrix and information about a channel used to create the beamforming feedback matrix.

\* \* \* \* \*